United States Patent [19]

Vrilakas

[11] 3,758,098

[45] Sept. 11, 1973

[54] MACHINE FOR WORKING ON DRIVE SHAFTS

[76] Inventor: Mark Vrilakas, P.O. Box 561, West Sacramento, Calif. 95691

[22] Filed: Sept. 20, 1971

[21] Appl. No.: 181,752

[52] U.S. Cl............... 269/55, 29/237, 228/48, 269/208
[51] Int. Cl........................................... B23k 37/04
[58] Field of Search................ 29/237, 238, 404, 29/525; 228/6, 44, 48; 269/12, 20, 55, 69, 207, 208, 287

[56] References Cited
UNITED STATES PATENTS

| | | | |
|---|---|---|---|
| 2,753,826 | 7/1956 | Dougherty | 228/48 X |
| 1,430,226 | 9/1922 | Goodreau | 269/208 X |
| 3,338,574 | 8/1967 | Rudolph | 269/207 X |

FOREIGN PATENTS OR APPLICATIONS

| | | | |
|---|---|---|---|
| 58,516 | 11/1946 | Netherlands | 269/69 |

Primary Examiner—Harold D. Whitehead
Assistant Examiner—Mark S. Bicks
Attorney—Lothrop & West

[57] ABSTRACT

Particularly for working on automotive drive shafts including universal joints is a machine including a frame on which are mounted a headstock and a tailstock movable along a common axis toward and away from each other, the tailstock being lockable in any of several selected positions and carrying a tail centering device for supporting one end of a drive shaft. Also on the frame is a headstock having a head centering device mounted therein for rotation about the same axis and for movement along such axis toward and away from the tailstock. Also mounted on the frame is a hydraulic jack structure for moving the head centering device toward the tail centering device, the latter being particularly backed up by a stop for limiting axial movement of the tail centering device.

4 Claims, 9 Drawing Figures

PATENTED SEP 11 1973 3,758,098
SHEET 1 OF 2
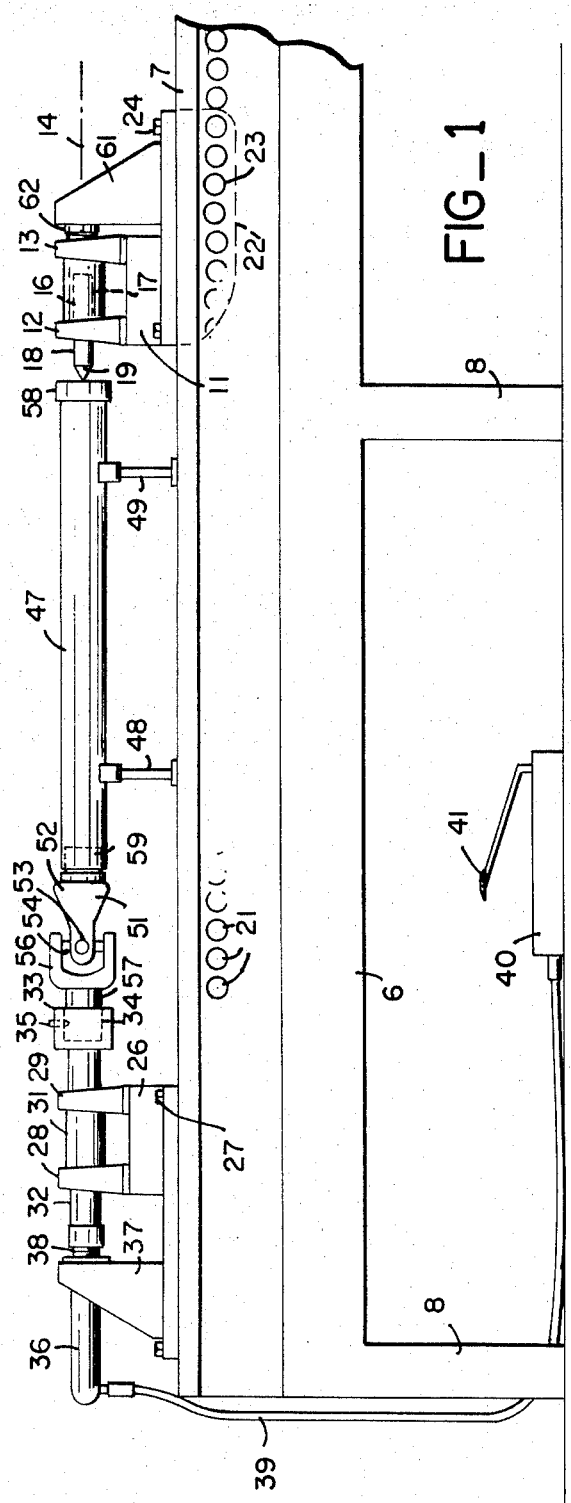
FIG_1
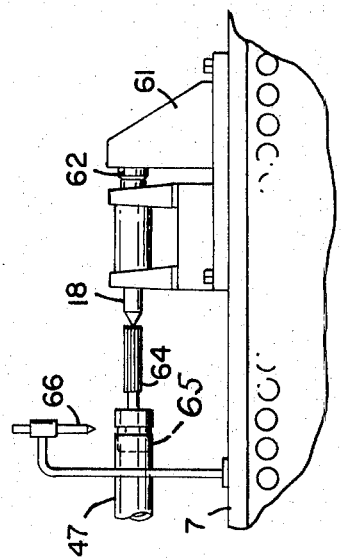
FIG_2
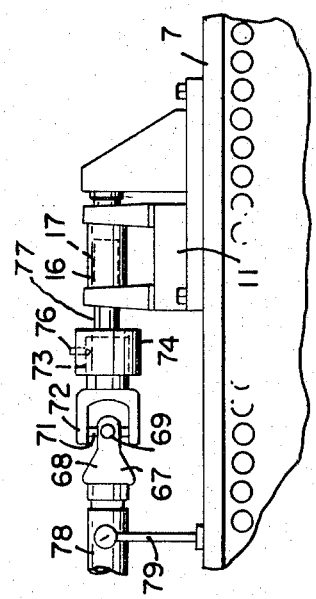
FIG_3
INVENTOR.
MARK VRILAKAS
BY
Lothrop & West
ATTORNEYS

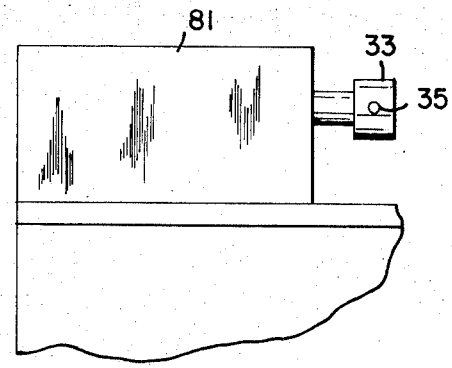
FIG_5
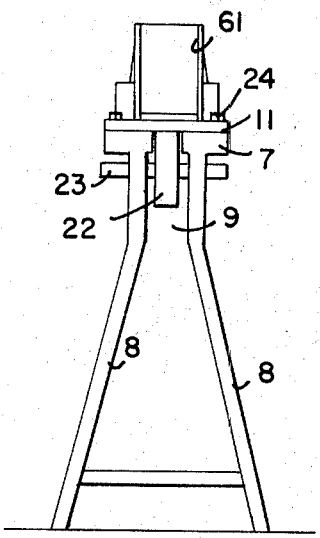
FIG_4
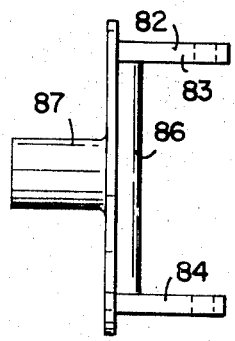
FIG_7
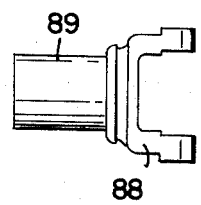
FIG_8
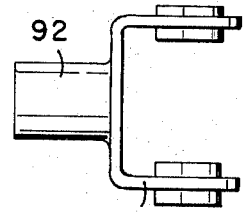
FIG_9
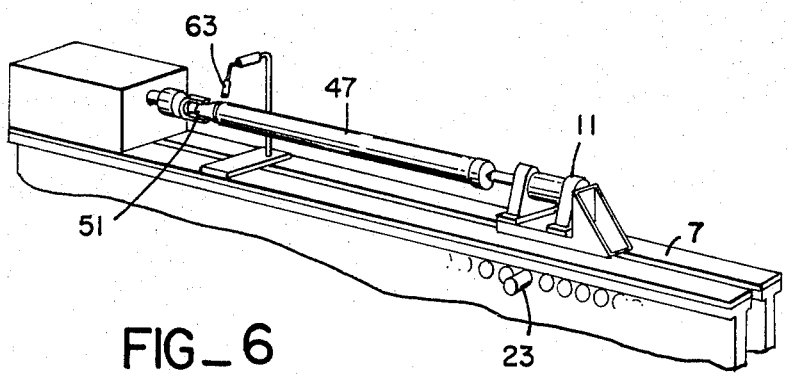
FIG_6

MACHINE FOR WORKING ON DRIVE SHAFTS

Most present automotive devices, including automobiles, trucks, off-highway vehicles, tractors, carriers and the like, have a drive train or drive line between the engine and the ground wheels which at some point includes one or more power transmitting means generally characterized as drive shafts. A drive shaft is herein understood to be a generally elongated rotatable member having a means such as a universal joint at one end for permitting angular flexing of the drive line and sometimes having a second universal joint adjacent the other end thereof. In some instances the drive shaft likewise includes a slip joint effective to permit axial relative motion of the parts of the drive shaft while insuring that they rotate in unison. Also, some drive shafts include, usually near the center, a pair of closely coupled universal joints serving as a constant velocity connection. Universal joints frequently utilized are single joints having a central cross connected through anti-friction bearings with yokes or cages. They vary substantially in size, in capacity, in mounting and arrangement of bearings. Some drive shafts in the effect involve duplex universal joints in which two universal joints are carefully coupled together with a predetermined, polar relationship so that overall the drive shaft is a constant velocity rotation transmitter. In commercial practice there is a wide assortment of drive shafts and of universal joints in character, in size and in capacity and there is further variation in the individual characteristics of universal joints and drive shafts depending upon the manufacturer thereof.

As vehicle speeds have increased over the years, the speed of operation of the drive shaft has likewise generally increased and the loads transmitted have likewise increased. It has, therefore, become increasingly important to make sure that the drive shaft is always operating in a condition of satisfactory or even optimum balance, that multiple universal joints therein are properly oriented from the standpoint of their angular or polar relationship and that the initial tolerances for shaft and joint relationships are not departed from excessively.

Unfortunately, drive shafts are subject to various failures due to accident, misuse, and adverse conditions as well as ordinary fatigue failure and wear and hence are often rebuilt since the rebuilding is somewhat less expensive than replacement. At the same time, the rebuilding operation can itself be expensive so there is room for improving the facilities for reworking and rebuilding drive shafts of all sorts.

It is therefore an object of the invention to provide a machine particularly useful in the rebuilding or reconstruction of drive shafts.

Another object of the invention is to provide a machine useful in the rebuilding and reconstruction of drive shafts of a wide variety of different configurations, sizes and capacities.

An additional object of the invention is to provide a drive shaft rebuilding machine that can readily be utilized by one of only usual skills.

A further object of the invention is to provide a machine for working on drive shafts that is capable of assisting in all phases of the work and can even be utilized for a final, high speed balancing operation.

A further object of the invention is to provide a machine for working on drive shafts that can readily be adapted to accommodate virtually any drive shaft that might ordinarily be encountered.

A further object of the invention is to provide a machine for working on drive shafts that is effective not only for some of the normal maintenance operations, such as bearing replacement, but can also be utilized for major overhaul, such as replacement of the drive tube and the like.

A further object of the invention is in general to provide an improved machine for working on drive shafts.

Other objects together with the foregoing are attained in the embodiments of the invention described in the accompanying description and illustrated in the accompanying drawings, in which:

FIG. 1 is a side elevation, with a portion broken away, of a machine for working on drive shafts pursuant to the invention;

FIG. 2 is a view similar to the right end of FIG. 1 but showing a modified arrangement of the machine of FIG. 1;

FIG. 3 is a view similar to the right end of FIG. 1 but showing a further modified arrangement of the drive shaft working machine;

FIG. 4 is an end elevation of the machine shown in FIG. 1;

FIG. 5 is a side elevation, with portions broken away, of a modified form of one end of the machine shown in FIG. 1;

FIG. 6 is an isometric view showing a machine, such as disclosed in FIG. 1, involved in a working operation;

FIG. 7 is an elevation of one form of a universal joint yoke;

FIG. 8 is a side elevation of another form of universal joint yoke; and

FIG. 9 is a side elevation of still a different form of universal joint yoke.

While the drive shaft working machine pursuant to the invention can be incorporated in a large number of different ways, it has with success been practically incorporated substantially as shown herein for use in the customary automotive shop.

The machine itself includes a main frame 6 having a substantially rigid, elongated bed 7, the entire unit being appropriately supported from the floor on legs 8 in the usual fashion. The support bed 7 can include a pair of generally parallel flat ways, like lathe ways, disposed in a horizontal plane and having a relatively wide space 9 therebetween.

Disposed on the support bed 7 is a tailstock 11 including a pair of journal bearings 12 and 13 aligned along a common horizontal axis 14. The bearings support a rotary hub 16 which is confined to rotation about the axis and generally against axial movement, although there is some end play afforded. The hub 16 has a hollow interior providing a bore 17 within which a tail centering device 18 is removably disposed. The centering device 18 is of a sort which can be readily hand centered and frictionally held and is effective by means of a conical end 19 to serve as a coaxial center for a drive shaft.

In order that the tailstock can be appropriately located at any one of several positions along the support bed, the frame 6 is preferably provided with transversely aligned apertures 21 arranged in an extensive series throughout much of the length of the frame.

Depending from the tailstock centrally between the sides of the frame and into the space 9 is a rib 22 having therein at least one transversely extending opening of the same general size as the apertures 21. In successive increments of the tailstock position the opening can be aligned transversely with selected ones of the apertures. That is, the tailstock can be positioned very close to a location desired and can then be locked in position by inserting a bar 23 in the apertures and opening to lock the tailstock in position. Since there is some looseness and tolerance in this type of interconnection, the tailstock is furthermore held in position by clamping studs 24 working against the surface of the support bed. With both of these securing means the tailstock can be firmly located in any desired position.

Near the other end of the frame 6 and somewhat similarly situated on the support bed is a headstock 26 firmly secured in a set position by fastenings 27 which, however, when removed permit complete removal of the headstock. The headstock itself includes a pair of journal bearings 28 and 29 between them supporting a sleeve 31 within which a spindle 32 is mounted for rotation about the axis 14 and also for rectilinear translation along such axis toward and away from the tailstock. The spindle 32 at one end has a collar 33 provided with a recess or socket 34 therein of a predetermined depth and diameter to take a similarly shaped member and hold such member in any selected longitudinal or rotational position within the limits of the structure and to hold such member there by means of a set screw 35.

The spindle 32 is not only rotatable about the axis 14 but is also longitudinally movable along such axis and that motion is provided for by a hydraulic jack mechanism 36 disposed on a bracket 37 united with the headstock 26 on the support bed. The jack 36 includes the usual cylinder and also a piston 38 designed to come into reasonably close proximity with the end of the spindle 32. The cylinder 36 is supplied with hydraulic fluid under pressure through a flexible hose 39 extending to a foot operated hydraulic pump 40 having a pedal 41 thereon and also including suitable controls, not shown.

When a drive shaft is to be worked upon, it is preferably arranged, particularly as shown in FIG. 1, with the central tube 47 thereof resting on temporary steady rests 48 and 49. Assuming the tube has a universal joint 51 at one end thereof, the yoke 52 of the universal joint is connected through its normal bearings 53 with a cross 54. This cross is then particularly mounted in suitable bearings in a special, complementary yoke 56 having an integral hub 57 which makes an accurate fit within the collar 33. The hub is held in position when the set screw 35 is tightened so that the universal joint 51 and the tube 47 are thus mounted at one end.

At the other end, the tube 47 may be provided with a plug disc 58 having a center which is engaged with the conical end 19 of the tail centering device 18. The drive shaft is thus suitably mounted for rotation by hand about the axis 14 so that the temporary steady rests 48 and 49 can be removed.

If, for example, the operation to be performed is the mounting of the universal joint yoke 52 on a new tube 47, the foregoing mounting process is followed except that prior to mounting in the machine, the boss 59, which is a portion of the yoke 52, is initially inserted into the hollow interior of the tube 47 as far as it can readily be placed manually. Thereafter when the device has been put into the machine, the pedal 41 is operated a number of times so as to increase the pressure in the cylinder 36 and translate the piston 38 to the right in FIG. 1. This means that pressure is exerted on the spindle 32 along the axis 14 and in effect forces the boss on the universal joint yoke 52 into the tube 47 to an appropriate amount.

Since this axial pressure puts a substantial load on the tailstock and since there is some slight axial movement therein, I prefer, pursuant to the invention, to provide on the tailstock an upstanding permanent bracket 61 carrying a thrust pad 62 in line with the end of the rotary hub 16. While a small amount of end play is permitted, anything over a small amount is resisted by the thrust pad and the bracket 61 so that substantial force can be exerted by the hydraulic cylinder 36 in making the indicated assembly.

When the boss 59 has been forced into the tube 47 as much as desired, the controls for the jack pump 40 are reversed and pressure relaxed from the cylinder 36. Then the tube and joint can be rotated slowly while a welded junction is made between them. This involves the making of a weld bead between those parts. As particularly shown in FIG. 6, it is convenient to support a suitable welding tool 63 on the machine bed 7 to make a weld entirely around the junction. Upon completion of the welding operation, the tailstock 11 is backed off, the set screw 35 is released and the united drive shaft parts are withdrawn from the machine.

For a somewhat different operation, it can be assumed that the tube 47 is mounted as shown in FIG. 1 and that a spline end 64 (FIG. 2) is to be assembled with the right end of the tube 47. In that instance the boss 65 of the splined end is manually inserted into the tube as far as possible and the tube is mounted as before with the spline end 64 abutting the tail center 18 and with the bracket 61 and the stop pad 62 in position. When the hydraulic jack 36 is actuated the tube 47 is translated toward the right and is brought fully home on the boss of the splined member so that at their meeting faces a welding tool 66 can be employed to make a permanent connection. Following this, the parts can be removed from the machine as before.

It may likewise occur that the tube 47 at some time is to be worked on when it has a universal joint 51 at one end and another universal joint 67 (FIG. 3) at the other end. In this instance the universal joint 67 includes a yoke 68 joined through suitable bearings 69 to a cross 71 mounted in the bearings of an adapter yoke 72. On the yoke 72 is a central hub 73 designed to fit into an adapter socket 74 in which the hub is held by a set screw 76. Forming part of and joined to the socket 74 is a standard shaft 77 designed to fit into the bore 17 of the rotary hub 16 in place of the tail centering device 18. With this setup, when the tube 78 is appropriately positioned, it can be forced onto the yoke 68 as before and the appropriate weld or other operation conducted. As a matter of fact, the eccentricity of the newly mounted tube can be checked by a surface gauge 79 mounted on the bed 7 and operated to afford the usual indication.

If desired, there can be incorporated, usually with the headstock 26, a standard form of dynamic balancer indicated in FIG. 5 by a rectangular housing 81. The balance is effective to rotate the collar 33 and the assembled drive shaft, as previously described, at a sufficient speed to duplicate the ordinary operating rotation. The balancer 81 is a well known commercial device and is not illustrated in detail. Suffice it to say that the balancer affords an indication of the out of balance of the drive shaft mounted in the machine. By appropriate balancing techniques the shaft can be brought within the desired balance limits.

As an indication of some of the wide variety of adapters provided for use in the regular adapter sockets 34 and 74 to meet the widely variant kinds of drive shafts encountered in practice, there are illustrated in FIGS. 7, 8 and 9 some of the perhaps dozens of devices practically utilized. For example, in FIG. 7 there is an adapter 82 having a relatively wide spacing between the bearing mounts 83 and 84 of the yoke 86. This adapter has a standard size hub 87 identical with the hub 73 and identical with the hub 57 so that all of the hubs are received by the same sockets such as 34 and 74.

Similarly, as shown in FIG. 8, there is a universal joint yoke adapter 88 having a much narrower spacing between the bearing carrying portions but nevertheless being provided with a hub 89 of precisely the same dimensions as the hub 87 so that the yoke adapters 88 and 82 are interchangeable. Similarly, as shown in FIG. 9, the universal joint yoke adapter 91 therein, although differing from the yoke adapters 82 and 88, nevertheless has a standardized hub 92 itself fitting any of the adapter sockets 34 and 74 utilized with the machine.

By having an appropriate assortment of adapters such as are shown in FIGS. 7, 8 and 9 and by having all of the adapters provided with a standard hub such as 87, 89 and 92 and by utilizing adapter sockets such as 34 and 74, the machine can take on virtually any available drive shaft and can afford adequate service whether it is the positioning of a new universal joint at one end or the other end or both ends thereof, whether it is the truing or centering of an existing shaft, whether it is the replacement of a defective tube such as 47 with a new tube, whether it is the welding of parts together for a permanent operation, or whether it is a balancing operation to establish the correct rotating smoothness of the shaft. Any one or more operations can be done on the structure shown herein from the initial axial compression of the members for assembly through the welding and the final balancing despite variations in universal joint configuration and size.

I claim:

1. A machine for working on drive shafts comprising:
   a. a frame including a support bed;
   b. a tailstock slidably mounted on said support bed;
   c. means for retaining said tail stock in a selected position on said support bed;
   d. a tail centering device on said tailstock and having an axis;
   e. a headstock;
   f. means for mounting said headstock on said support bed;
   g. a head centering device rotatably and slidably mounted on said headstock coincident with said axis, said head centering device including an adapter socket having a bore of a predetermined diameter;
   h. an adapter including a yoke, a pair of bearings carried on the ends of said yoke to journal a universal joint cross therein; a central hub receivable in said socket, and means for removably retaining said hub in said socket; and,
   i. jack means on said frame for urging said head centering device to move slidably along said axis with respect to said headstock and toward said tail centering device.

2. A machine as in claim 1 including means for removably receiving said tail centering device in said tailstock, and means for removably receiving said head centering device in said headstock.

3. A machine as in claim 1 in which said tail centering device is rotatably mounted on said tailstock; and in which said tail centering device includes a hub socket having a diameter substantially equal to said predetermined diameter of said adapter socket, and an adapter comprising a yoke, a pair of bearings on the ends of said yoke to journal a universal joint cross, and a central hub removably receivable in said hub socket for rotation therewith.

4. A machine as in claim 1 in which the universal joint cross is capable of fitting the bearings of a complementary universal joint yoke including a boss receivable in the drive shaft tube in an interference fit; and in which said jack means is capable of urging said boss into interference fit with said tube when said drive shaft is coaxially positioned between said head centering device and said tail centering device.

* * * * *